United States Patent

Kurtz et al.

[11] Patent Number: 5,955,771
[45] Date of Patent: Sep. 21, 1999

[54] SENSORS FOR USE IN HIGH VIBRATIONAL APPLICATIONS AND METHODS FOR FABRICATING SAME

[75] Inventors: Anthony D. Kurtz, Teaneck; Alexander A. Ned, Bloomingdale, both of N.J.

[73] Assignee: Kulite Semiconductor Products, Inc., Leonia, N.J.

[21] Appl. No.: 08/968,218

[22] Filed: Nov. 12, 1997

[51] Int. Cl.[6] .............................. H01L 27/20; H01L 29/84
[52] U.S. Cl. ...................... 257/419; 257/684; 257/710; 273/514.29; 438/456
[58] Field of Search .................... 257/415, 417, 257/418, 419, 684, 710; 273/514.29, 514.32; 438/456; 65/36, 155

[56] References Cited

U.S. PATENT DOCUMENTS

| | | | |
|---|---|---|---|
| 5,170,237 | 12/1992 | Tsuda et al. | 257/419 |
| 5,336,918 | 8/1994 | Ipposhi et al. | 257/49 |
| 5,471,086 | 11/1995 | Ipposhi et al. | 257/47 |
| 5,578,843 | 11/1996 | Garabedian et al. | 257/254 |
| 5,726,480 | 3/1998 | Pister | 257/415 |
| 5,780,885 | 7/1998 | Diem et al. | 257/254 |

*Primary Examiner*—Donald L. Monin, Jr.
*Attorney, Agent, or Firm*—Arthur L. Plevy, Esq.

[57] ABSTRACT

A hermetically sealed sensor device having a glass member defining a mounting surface and base surface, the glass member including one or more pin apertures extending through the glass member from the mounting surface to the base surface. A metallic pin is disposed in each of the pin apertures, each pin having a portion extending above the mounting surface. The sensor device also includes a semiconductor sensor chip including a semiconductor device and a cover hermetically bonded and sealed to a surface of the semiconductor device, the cover protecting the semiconductor device from the external environment. The is chip hermetically bonded and sealed to the mounting surface of glass member. The semiconductor device has one or more contacts disposed on the surface thereof, for making electrical contact thereto, the cover having one or more contact apertures extending therethrough which exposes a portion of the contacts. The portion of each pin extending above the mounting surface is received within the contact apertures and a conductive glass frit mixture disposed in the contact apertures, hermetically seals the contact apertures and provides electrical continuity between the pins and the contacts.

20 Claims, 8 Drawing Sheets

SENSORS FOR USE IN HIGH VIBRATIONAL APPLICATIONS AND METHODS FOR FABRICATING SAME

RELATED APPLICATIONS

Kulite Semiconductor Inc., the assignee herein is record owner of U.S. patent application Ser. No. 08/897,470 entitled COVERED SEALED PRESSURE TRANSDUCERS AND METHOD FOR MAKING SAME, filed on Jul. 21, 1997 by Kurtz et al.

FIELD OF THE INVENTION

The present invention relates to semiconductor transducers and more particularly, to a method of fabricating and packaging a high temperature pressure sensor capable of handling high vibrational requirements.

BACKGROUND OF THE INVENTION

Semiconductor pressure transducers are frequently used in applications which require operation in harsh environments that are corrosive and/or involve high temperatures. Accordingly, the stress sensing network of transducers used in such applications, must be protected from these harsh environmental conditions in some way in order for the transducer to remain operational over extended periods of time. In the past, surface over-coatings such as silicon nitride, silicon dioxide and the like, have been provided over the stress sensing network to protect it from harsh operating environments. However, such coatings provide only partial protection as the metallized contact areas of the sensing network remain exposed, which presents problems in applications which involve corrosive environments.

One method which enables the transducer to remain operational in corrosive and high temperature environments involves exposing the backside of the transducer to ambient pressure while hermetically sealing the stress sensing network located on the front side thereof, in the active portion of the diaphragm surface. Such a method is described in co-pending U.S. patent application Ser. No. 08/458,405 filed on Jun. 2, 1995 entitled: HERMETICALLY SEALED TRANSDUCER AND METHODS FOR PRODUCING THE SAME, by A. D. Kurtz and assigned to Kulite Semiconductors Products, the assignee herein. The co-pending application describes a hermetic seal which utilizes a PYROCERAM glass frit or similar means, to bond a cover member to the front side of the transducer to hermetically seal the sensing network.

The glass is used in the above-described application to bond the cover member to the inactive portion of the diaphragm because the fabrication processes used in forming the sensing network of the transducer will result in raised surface features when the transducer has a silicon-on-oxide (silicon-on-silicon) structure. The raised surface features such as where the sensing network extends into the contact areas, are not planar with the underlying substrate since they are formed on top of the oxide. This makes it difficult to form a hermetic seal by electrostatically or fusion bonding a cover member to the inactive portion of the diaphragm. For instance, in a silicon-on-oxide transducer structure, the entire silicon network and particularly, the regions on the inactive portion of the diaphragm leading to the metalized contact areas (lead-outs) are elevated from the oxide by several microns. Moreover, a finite space is provided between these raised lead-outs on the order of mils to prevent them from electrically shorting together. The step height of the lead-outs and the finite spaces therebetween create gaps between the cover member and the inactive portion of the diaphragm. These gaps make it virtually impossible to form a hermetic seal between the cover and the inactive portion of the diaphragm by electrostatic or fusion bonding and thus, a glass frit can be used to fill the gaps to create a hermetic cover.

Although the glass frit enables the cover member to be bonded to the inactive portion of the diaphragm to hermetically seal the stress sensing network, there are problems associated with this method. For example, the glass frit has a tendency to flow onto the diaphragm during the high temperature sealing process which causes the performance of the sensors to degrade. There are also thermal mismatching issues and other process compatibility issues which require consideration when using a glass frit. All of this makes the glass frit a difficult material to use for fabricating hermetically sealed covers.

Another problem associated with such a sensor or transducer structure is that the ball bonded lead wires are exposed to the operating environment. Consequently, particles which may be present in the pressure transmitting environment can come into contact with the lead wires and possibly damage them.

During the last few years considerable time and research has been devoted to the development of dielectrically isolated silicon on silicon piezoresistive sensors. In prior art devices the resulting structure consists of a highly doped p+ sensor network fusion bonded to an oxide layer which has been grown on an underlying support wafer. The support wafer in turn forms the flexing portion of the sensor. For instance, a dielectrically isolated Wheatstone bridge sensor consists of four resistor elements situated in a strain sensitive area of the sensor as well as at least four lead-out portions which are directed to contact areas on the non-flexing portion of the structure. It is of course obvious that each of the lead-out structures must be isolated from each other and there must be a space between them. When the sensor is affixed to an additional support structure, on the side of the sensor away from the sensor-resistive network, obtaining an hermetic seal between the sensor and the additional support structure is no problem because the non flexing surface of the support wafer is planar.

However when one attempts to fasten a support member on the sensor-network side, several problems emerge. Although it is possible to seal to the emerging fingers from the sensing network, the spaces between the emerging fingers extend into the flexing region and no hermetic seal can result. This is a particular problem when ones does not want to expose the sensing network side of the sensor to a specific pressure medium. For this case the side of the sensor not exposed to the media must be bonded to the support structure. However, this means that the bond must be made to the side containing the sensor network and the contact fingers. Thus the air leakage paths along the fingers must be sealed. One obvious method of obtaining a seal to attach the support structure to the network side of the sensor is to use a thick enough glass frit which will fill in the spaces between the fingers as well as seal the non deflecting portion of the sensor surface to the support. However, this method gives rise to certain problems. The frit generally has a different and higher thermal expansion coefficient then the silicon sensor structure and the support. It will, therefore, introduce unwanted thermal stresses in the resulting final structure. In addition, during deflection, mechanical stress is applied to the frit and for large stresses at high temperature it may yield. Moreover, the frit to structures seal is made at high temperature and some of the frit may flow onto the flexing portion of the sensor or into the contact areas thus degrading the device performance.

It is, therefore, an object of the present invention to provide an improved method for hermetically sealing a semiconductor pressure transducer which substantially eliminates the use of a glass frit to bond a cover member to the active side of the transducer.

SUMMARY

The object of the present invention is accomplished by providing a smooth sealable P+ border around the entire sensor to which the seal is made by means of an electrostatic bond and by making sure that the P+ fingers are also sufficiently smooth so that an electrostatic bond may be made to the portions of the fingers on the non-flexing portion of the sensor.

The provides many advantages such as a better structure which does not creep and that has less thermal stress, since an electrostatic bond is made at a lower temperature which does not disturb the metal contact region, and no excess flow of frit on the active portion of the sensor, and the electrostatic bond seal is made at lower temperature. Other advantages include no need to confine the frit to a specific area of sensor, and the second use of a frit to secure the sensor to a header can be done at a lower temperature and with no tensile stress on the joint point because the applied pressure puts the frit of the second seal into compression.

An unanticipated advantage of the present invention is that if the cover member has small apertures over the contact fingers, located directly over the metal contact areas on the fingers, the electrical contact may be made using a gold-glass conductive paste that can then be used to contact pins or posts in a support header without the use of individually bonded wires affixed directly to the contacts. Since the present structure obtained by electrostatic bonding of the cover member to the silicon is not subjected to the extremely high temperatures required in a glass frit during the first sealing, the contact areas remain undamaged.

This allows the present invention to achieve the object of providing a method for attaching the sensor with its support member to a header containing contacts, pins or posts which will align with holes in the support member. The holes in the support member will confine the gold (metal) glass mixture and allow an effective contact to be made on the side of the sensor away from the media so that no contacts are exposed to the pressure media or other foreign matter.

BRIEF DESCRIPTION OF THE DRAWINGS

For a complete understanding of the present invention, reference should be made to the following drawings wherein.

DETAILED DESCRIPTION OF THE INVENTION

Figure 1:
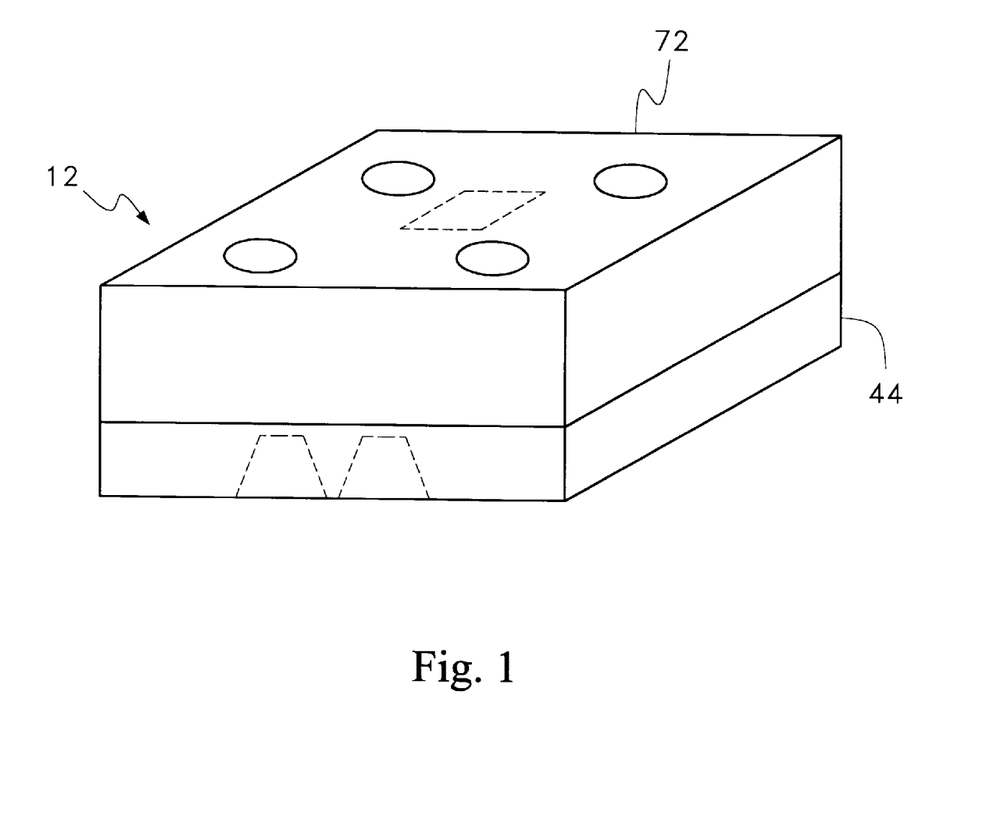
FIG. 1 is a perspective view of a hermetically sealed sensor chip used in the transducer of the present invention.

In FIG. 1, there is shown a perspective view of the sensor transducer chip 12 used in the present invention. The chip 12 comprises an individual semiconductor pressure sensor 44 which is hermetically sealed by a cover 72.

Figure 2:
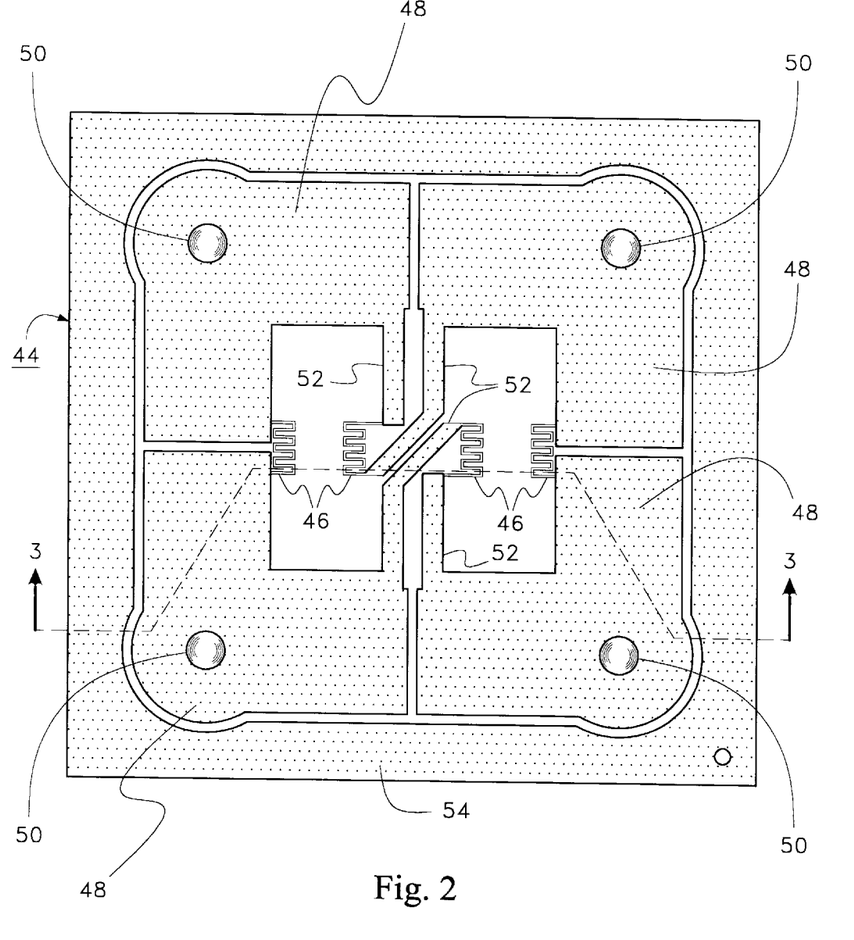
FIG. 2 is a top plan view of the semiconductor transducer employed in the sensor chip.

A plan view of the semiconductor sensor 44 of FIG. 1 is depicted without the cover 72 in FIG. 2. The pressure sensor 44 is approximately 100 mils by 100 mils and is fabricated from two or more semiconductor wafers of silicon, or any other suitable semiconductor wafer material. The transducer 44 is fabricated using conventional wafer processing techniques which enable a number of dielectrically isolated piezoresistive sensor elements such as 46, composed of highly doped (P+) silicon to be formed on semiconductor material using dielectric films of $SiO_2$ or the like. It is understood that a number of such sensors can be made at the same time on a large substrate. Each sensor element 46 is essentially a variable resistor in one of four legs of a Wheatstone bridge circuit with each of the respective resistances varying in proportion to an applied force or pressure to the transducer 44.

The circuit nodes of the Wheatstone bridge consist of four oversized P+ diffused silicon electrical contact areas or fingers 48, which are mainly located in non-active areas of the transducer 44. The term "finger" is used to indicate that the areas 48 project from the sensor 46 to the metal contacts 50. The metal contacts 50 within the contact area are circular in shape and are each approximately 10 mils in diameter. Each contact 48 includes a centrally located area of high temperature platinum-titanium metallization 50.

Figure 3:
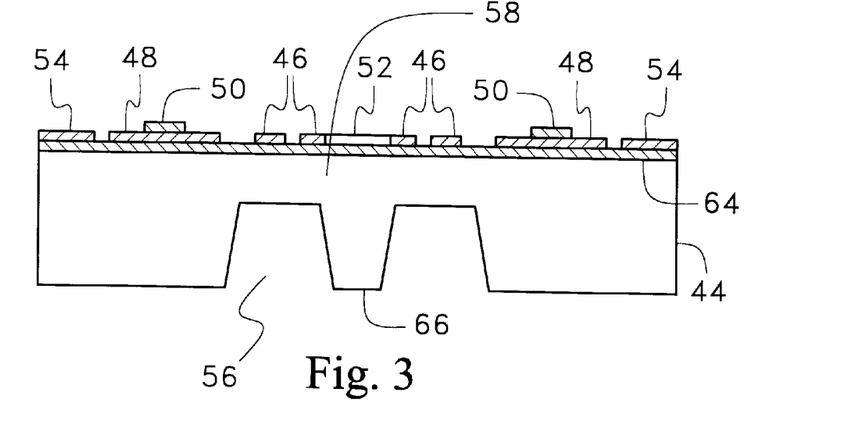
FIG. 3 is a cross-sectional side view through line 3—3 of the sensor of FIG. 2.

Referring to FIG. 3, which shows a cross-sectional view through line 3—3 of FIG. 2, a closed-ended aperture 56 is formed in the bottom of the transducer 44. The area above the aperture is generally referred to as the "active area" of the transducer 44, this area defining an N-type silicon diaphragm 58 to which the sensor elements 46 are attached and located. The "active area" deflects upon the application of a force thereto. The areas of the transducer 44 that are external to the active area are conventionally termed the "non-active" areas. The dielectrically isolated sensors elements 46, the electrical contacts 48, the interconnections 52, and the raised rim 54 are readily fabricated using processes described in U.S. Pat. No. 5,286,671 to Kurtz et al, the disclosure of which is incorporated herein by reference.

The process taught in U.S. Pat. No. 5,286,671 starts with an N-type sacrificial wafer 60 into which the high conductivity P+ areas which form the sensor elements 46, the contacts 48, and the interconnections 52 are diffused using oxide and/or nitride masking and photolithography as shown. In the present invention, the P+ raised rim 54 is also fabricated along with the other P+ structures.

Figure 4A:
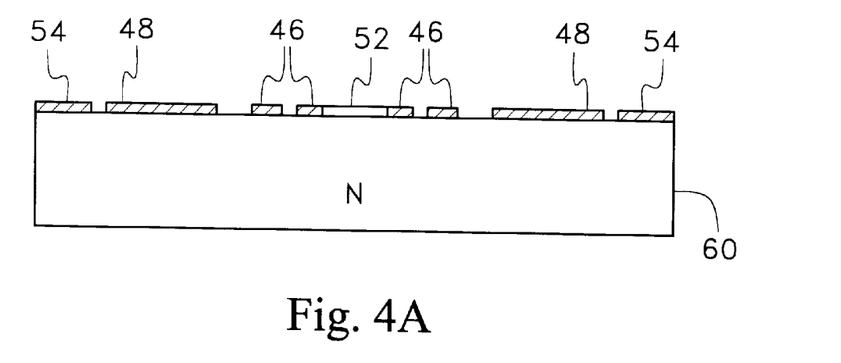
FIGS. 4A and 4B are cross-sectional side views depicting the fabrication of the semiconductor sensor of FIGS. 2 and 3.
Figure 4B:
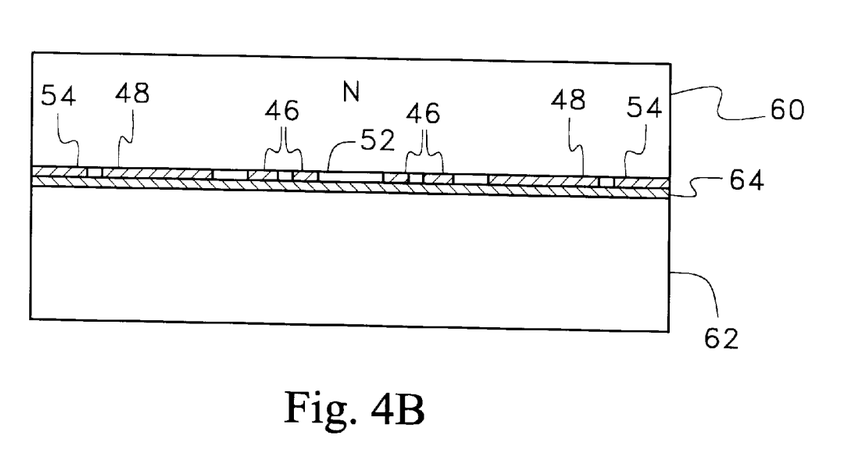

As shown in FIG. 4A, subsequent to the diffusion, the surface of the sacrificial wafer 60 is treated with a conductivity-selective etch which does not attack the P+ areas 46, 58, 52, 54 leaving them raised from the surface. In FIG. 4B, the sacrificial wafer 60 is then fusion-bonded to an N-type "diaphragm" wafer 62 which has been previously treated to obtain a dielectric layer 64 of preferably 5000 Å to 15,000 Å of silicon dioxide thereon. Although the dielectric layer 64 is preferably silicon dioxide, other dielectric layers can be used as well. The dielectric layer 64 operates to dielectrically "isolate" the sensor elements 46 from the diaphragm wafer 60. After fusion bonding, the N-type material of the sacrificial wafer 60 is removed using a conductivity-selective etch, leaving only the P+ sensors 46, the interconnections 52, the contact areas 48 and the raised rim 54 bonded to the diaphragm wafer 62 to produce the transducer 44 of FIG. 3. The contact areas are then metalized using conventional techniques and at the same time, the aperture 56 is fabricated in the bottom of the diaphragm wafer 62 to form the diaphragm 58 of the transducer 44. The thickness of the diaphragm determines its stiffness. Note that the position of the sensor elements 46 with respect to the diaphragm 58 is determined by the form factor of the diaphragm 58, i.e., flat plate or the shown bossed structure identified by numeral 66. The diaphragm wafer 62 itself may be shaped using known etching techniques as is taught in U.S. Pat. No. 4,236,137 to Kurtz et al., which is incorporated herein by reference.

Figure 4C:
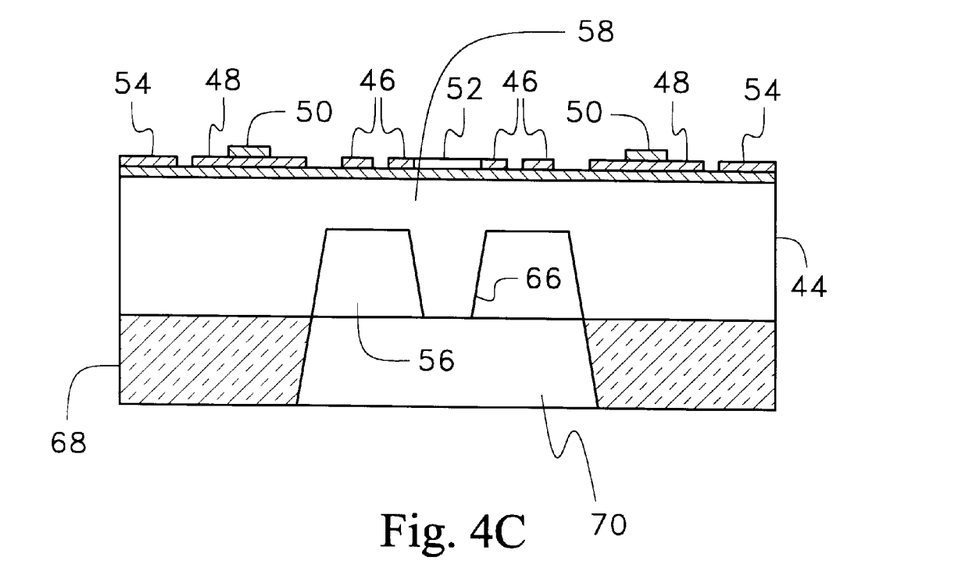
FIG. 4C is a cross-sectional side view through the semiconductor sensor of FIG. 4B showing the addition of an optional reinforcement structure.

At this point, a glass substrate 68 can be optionally provided if desired by electrostatically bonding it to the non-sensing side of the transducer 44 for additional clamping, as is shown in FIG. 4C. The glass substrate 68 may be made of PYREX or silicon containing a PYREX layer. The glass substrate 68 or silicon substrate includes an aperture 70 that extends therethrough. The aperture 70 allows a force or pressure to be applied to the underside of the diaphragm 58 to deflect and induce a stress which causes the resistances of the piezoresistive sensor elements 46, to change.

Figure 5A:
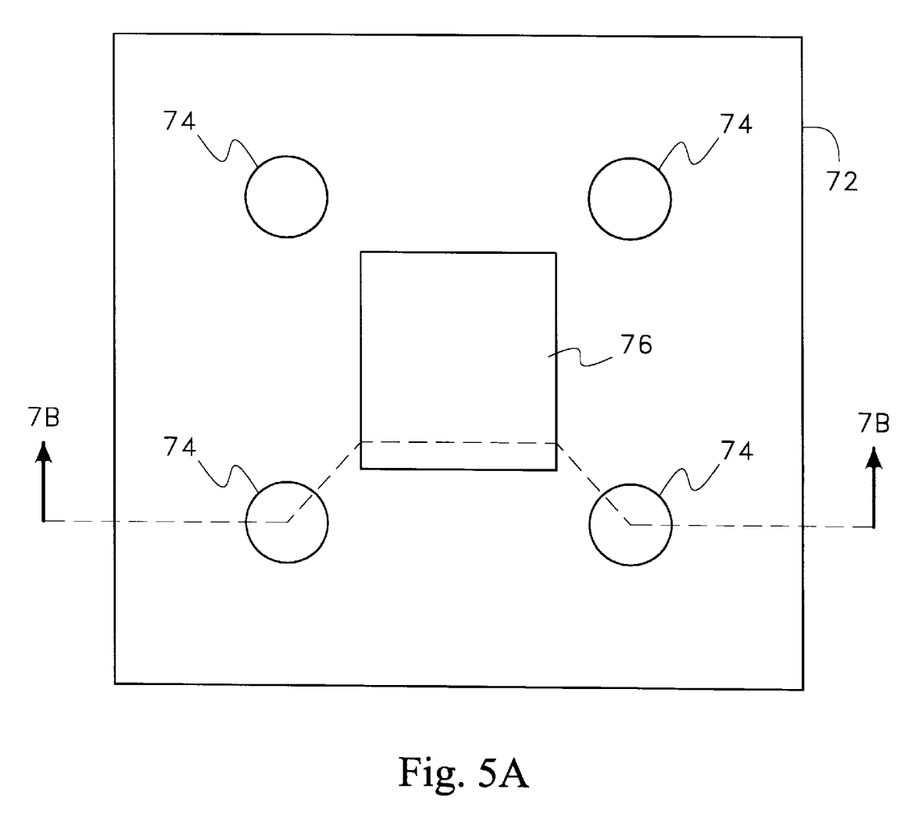
FIG. 5A is a bottom plan view of the cover of the sensor chip of FIG. 1.
Figure 5B:
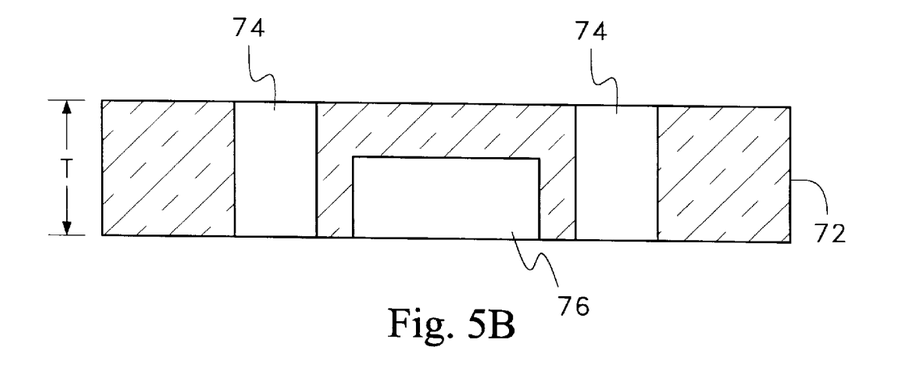
FIG. 5B is a cross-sectional side view through line 7B—7B of the cover of FIG. 5A.

Referring now to FIG. 5A, there is shown a bottom view of the cover 72 which is to be bonded to the transducer 44 of either FIGS. 3 or 4C. The cover 72 is fabricated from a glass such as PYREX. It is understood that geometries other than square may be utilized for the cover 72 with the geometry used being generally congruent to that of the transducer 44. In any case, the cover 72 has four apertures 74 disposed in areas of the cover 72 which will overlie the metallized portions 50 (FIG. 2) of the contacts 48 of the transducer 44. Each aperture 74 is fabricated to be approximately 10 mils in diameter so that a corresponding header pin 36 (FIG. 8C) can be received therein as will be explained. The cover 72 also has a centrally located cavity 76 which will overlie the active area of the transducer 44 and enable the diaphragm 58 to flex when a force or pressure is applied thereto. As shown in FIG. 5B, which is a cross-sectional view through line 7B—7B of FIG. 5A, the cover 72 has a thickness T which is on the order of approximately 5 mils thick.

Once fabricated, the cover 72 is ready to be electrostatically bonded without sealing glasses and the like to the transducer 44 of FIG. 3 or 4C. The cover 72 is applied directly to transducer 44 so that the bottom surface of the cover 72 directly engages the P+ diffused raised rim 54 and enlarged contacts 48 in the non-active area of the transducer 44. No sealants of any type are needed between the cover 72 and the transducer 44 because the oversized contacts 48 and the raised rim 54 are provided on the transducer 44. The cover 72 is then electrostatically bonded to the transducer by placing the two wafers in a heated vacuum chamber (not shown) and heating them under a vacuum for about 45 minutes at approximately 400° C. At the same time, a high voltage on the order of 400 to 1500 volts D.C. is applied between the cover 72 and the transducer 44. This process causes the bottom surface of the cover 72 to become slightly conductive such that an intimate bond between the cover 72 and the P+ diffused raised rim 54 and fingers 48 of the transducer 44. The seal to the rim and the fingers provide the hermetic seal for the sensor.

Figure 6:
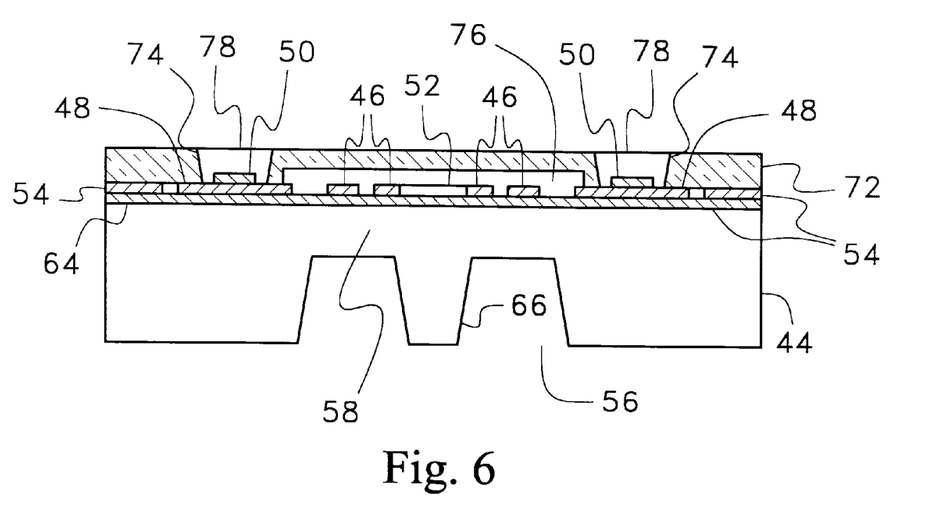
FIG. 6 is a cross-section side view through the semiconductor sensor of FIG. 3 after the cover has been electrostatically bonded to produce the hermetically sealed sensor chip of FIG. 1.

Upon completion of the electrostatic bonding operation, the transducer 44 is now hermetically sealed and the resulting wafer of which an individual sensor is shown as chip 12 is removed from the vacuum chamber. The wafer is now cut into individual dice the structure of which is shown in as 12 leaving the rim portion on the outside of the chip. The seal to the rim insures that there is no passage of gas or any fluid from the outside of the chip into the active area. In addition, the seal to the fingers also insures that there is no passage of gas or other fluids from the contact area into any internal portion of the sensor. Referring now to FIG. 6, the hermetically sealed sensor chip 12 is prepared for header mounting by filling the apertures 74 in the cover 72 with a conductive glass frit 78, preferably a mixture of gold and glass frit. It is preferred that the glass frit is made with PYROCERAM, a glass material manufactured by Corning Glass Co. These glasses are thermosetting and devitrify at temperatures on the order of 450 degrees C. Upon devitrification, the glass develops a crystalline structure which results in a strong seal as the crystallized material's softening point is higher than conventional glass. PYROCERAM also exhibits excellent mechanical properties at temperatures well in excess of 400 degrees C.

The PYROCERAM glass frit is prepared by mixing the finely powdered PYROCERAM glass and gold with a suitable suspension vehicle, such as a mixture of nitrocellane in anylacerate, to a desired consistency to form a paste-like mixture of gold-glass frit. The paste-like mixture of gold-glass frit 78 is then injected using any suitable method into each aperture 74 of the cover 72.

The header 14 described earlier is prepared by depositing a layer of PYROCERAM glass frit 80 prepared without the gold powder, onto the mounting surface 30 of the header glass 20 either manually or automatically using suitable tooling. The layer of glass frit 80 is deposited to a thickness of approximately 0.1 to 0.5 mils.

The hermetically sealed sensor chip is then lowered onto the mounting surface 30 of the glass header 20 with the cover 72 of the chip 12 facing the mounting surface 30 such that the head portions 40 of the header pins 36 enter the conductive-glass-frit 78 filled apertures 74 in the cover 72. The structure is then placed into a heated chamber (not shown) and a uniform, moderate pressure is applied to the chip 12 using a clamping fixture or the like to ensure that the glass frit 80 located between the mounting surface of the glass header 20 the outer surface of the cover 72 is evenly distributed therebetween. The structure is then fired or heated for about 45 minutes at approximately 500 degrees C. to simultaneously both cure the glass frit 80 and conductive-glass-frit 78, thereby achieving a hermetic mounting of the chip 12 on the glass header 20 as shown in FIG. 7C. Note that the head portions 40 of the header pins 36 are spaced from the metallization areas 50 of the contacts 48 as shown in FIG. 7C. It should be understood, however, that due to manufacturing tolerances and the like, that the head portions 40 of the header pins 36 can also directly contact the metallized portions 50 of the contacts 48 without any harmful effects.

Figure 7A:
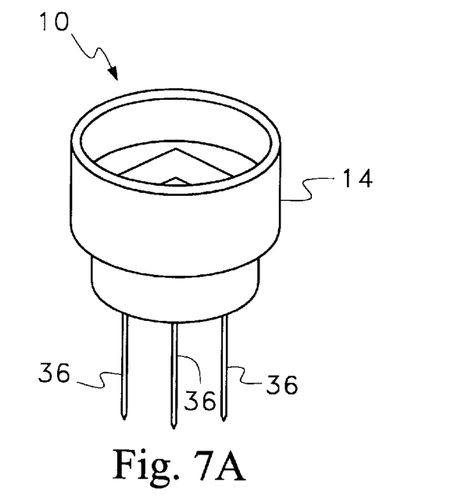
FIG. 7A is a perspective view of a hermetically sealed sensor made in accordance with the present invention.
Figure 7B:
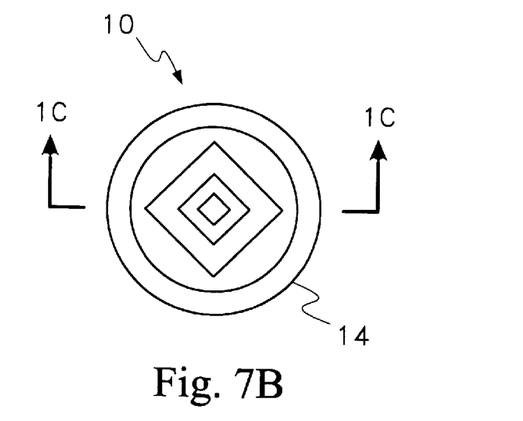
FIG. 7B is a top plan view of the sensor of FIG. 7A.
Figure 7C:
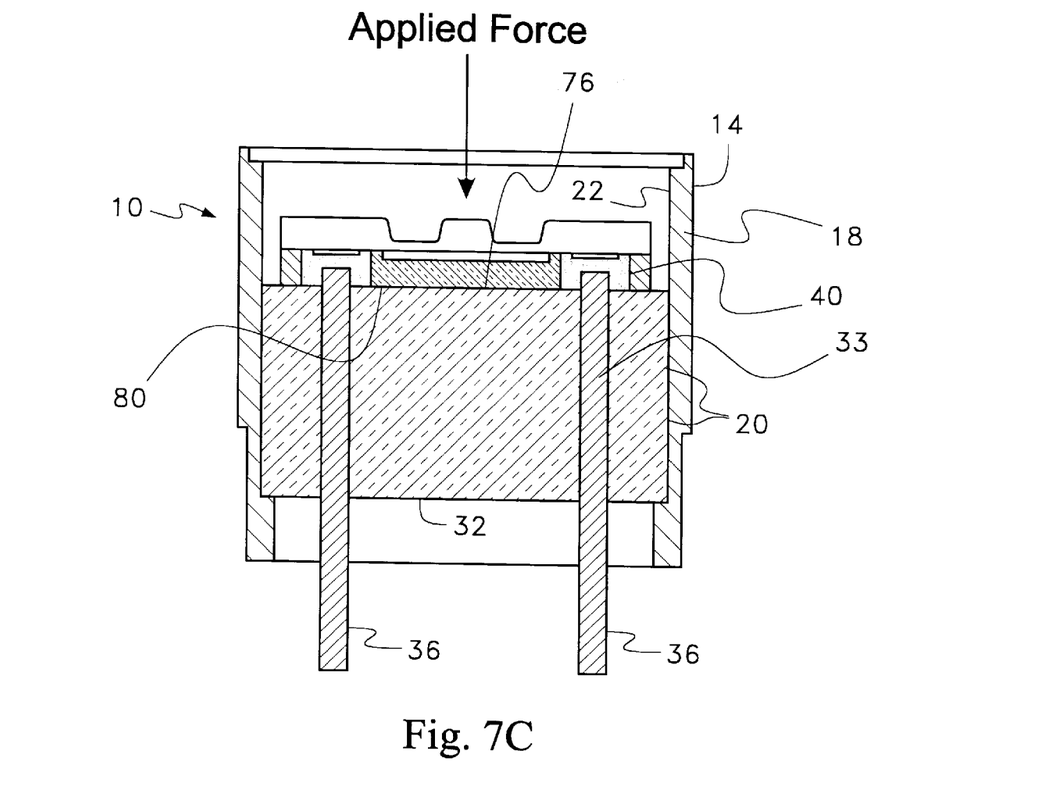
FIG. 7C is a cross-sectional side view through line 1C—1C of the sensor of FIG. 7B.

Referring to the perspective and top plan view of FIGS. 7A and 7B, a sensor 10 made in accordance with the present invention is shown. The sensor 10 is preferably a pressure transducer comprised of a hermetically sealed semiconductor transducer chip 12 packaged within a specially configured header 14 using a "lead-less" packaging technique as will be explained further on. Four header pins 36 extend out from the base of the header 14 to allow the sensor 10 to be electrically connected to external wires.

Figure 8A:
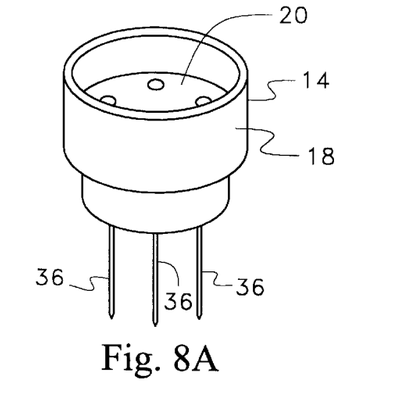
FIG. 8A is a perspective view of a header used in the sensor of FIG. 7A.
Figure 8B:
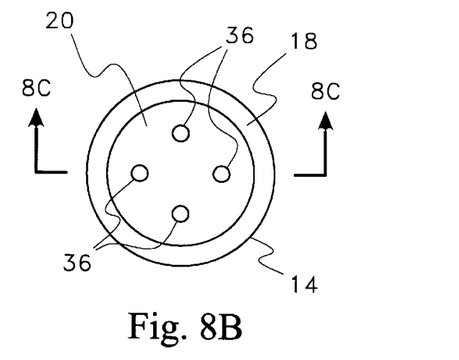
FIG. 8B is a top plan view of the header of FIG. 8A.

Referring now to FIGS. 8A and 8B, the header 14 is shown prior to chip mounting. The header 14 comprises a generally tubular-shaped sleeve or header shell 18 fabricated from a typical metallic material and a cylindrical-shaped glass header 20. In a preferred embodiment, the header shell 18 is fabricated from a metal or alloy material such as an iron-nickel-cobalt alloy sold under the trademark, KOVAR. This material may be nickel or chrome plated to prevent rusting. The header shell 18 has a cylindrical inner surface 22 of a diameter sufficient to accommodate the glass header 20.

Figures 8C, 8D:
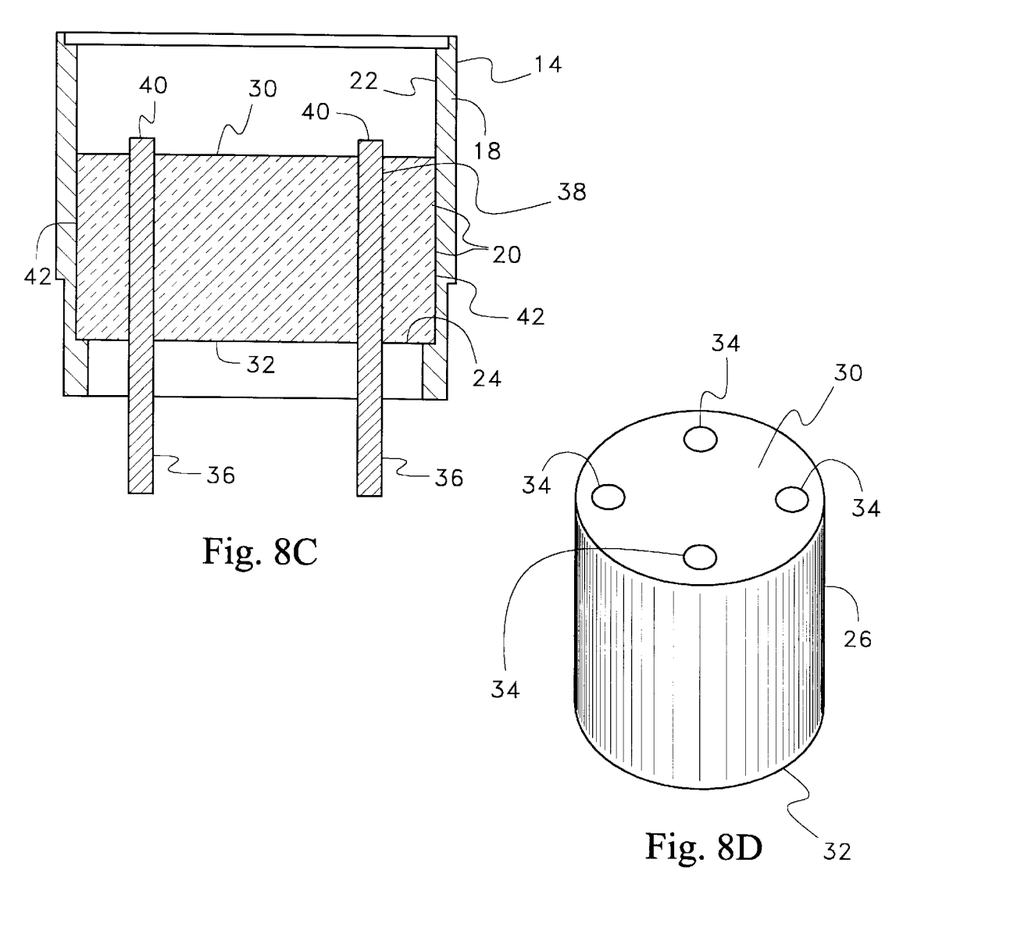
FIG. 8C is a cross-sectional side view through line 2C—2C of the header of FIG. 8B.
FIG. 8D is a perspective view of a glass header portion of the header of FIGS. 8A–8C.

As shown in FIG. 8C, which is a cross-sectional side view through line 8C—8C of FIG. 8B, the inner surface 22 of the header shell 18 includes a circular-shaped flange 24 at a marginal end thereof. The glass header 20 seats against the flange 24 and is hermetically bonded and sealed to the inner surface 22 of the header shell 18 (including the flange 24) preferably by any suitable glass-to-metal seal.

Referring to FIG. 8D, the glass header 20 consists of a cylindrical glass members 26, each of which is fabricated from a borosilicate glass such as is sold by Corning Glass under the trademark, PYREX. The glass member is selected to match the thermal expansion coefficient of silicon. In any case, four apertures 34 extend coaxially through the glass header 20 and are spaced 90 degrees apart about the marginal periphery thereof.

Referring again to FIG. 8C, a metallic header pin 36 is inserted into each of the four apertures 34. Each header pin 36 comprises a shaft member 38 and a head member 40 which extends past the end of the glass. The header pins 36 may be fabricated from KOVAR and gold plated. When installed in the apertures 34 of the glass header 20, the head members 40 of the header pins 36 engage the mounting surface 30 of the glass header 20 and protrude 2–5 mils therefrom. The shaft members 38 of the header pins 36 extend all the way through the aperture 34 and away from the base surface 32 of the glass header 20. The header pins 36 are hermetically bonded and sealed within the apertures 34 preferably by any suitable glass-to-metal seal 42. The pins are spaced such that their spacing corresponds to the spacings of the apertures in the chip.

The lead-less packaging method of the present invention provides excellent electrical continuity between the chip's contacts and the header pins. A transducer device made in accordance with the present invention exhibits all the advantages associated with dielectrically isolated sensing elements and is substantially protected from the operating environment.

Figure 9:
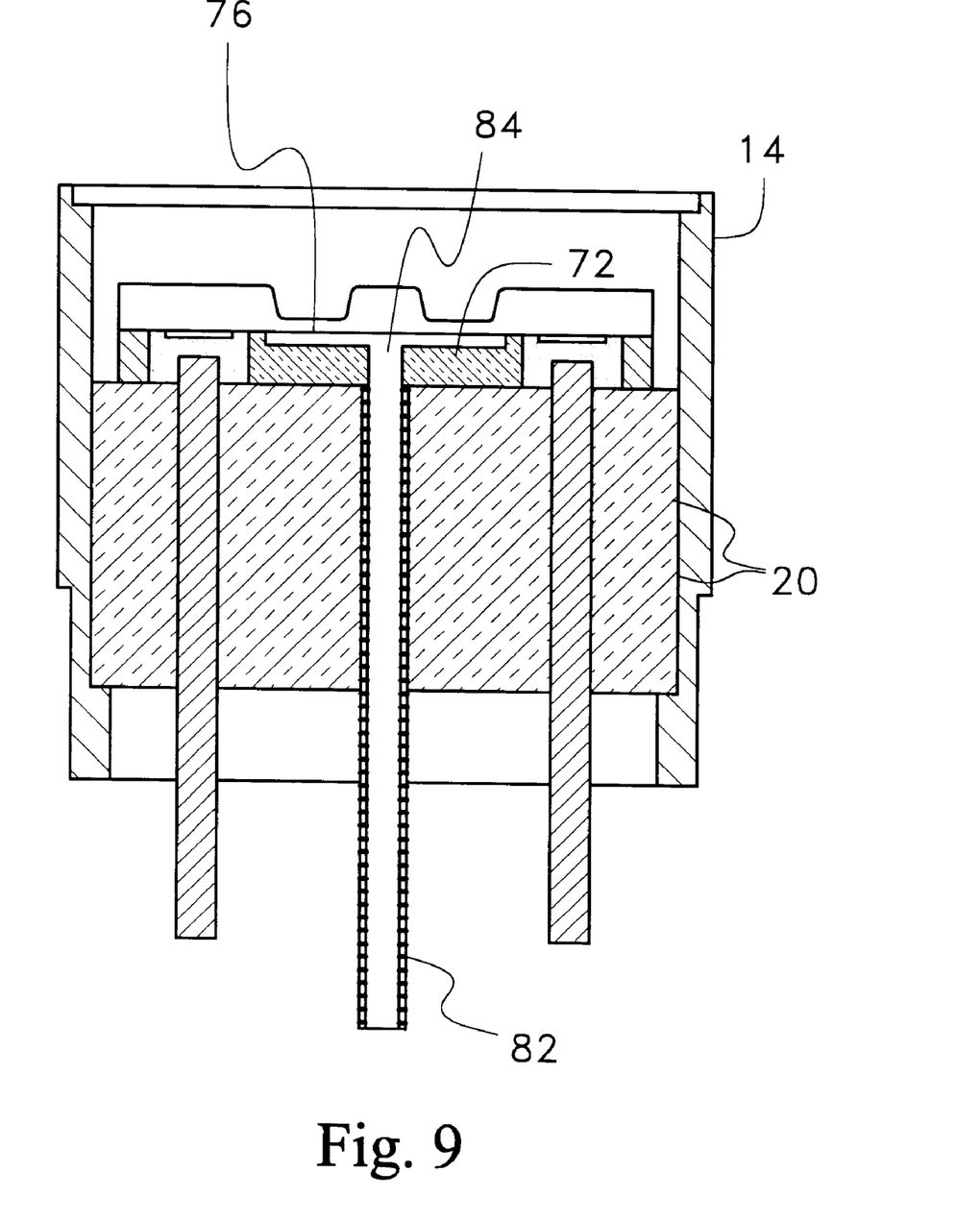
FIG. 9 is a cross-sectional side view of a sensor made according to a second embodiment of the present invention.

It will be understood that the embodiments described herein are merely exemplary and that a person skilled in the art may make many variations and modifications to the described embodiments utilizing functionally equivalent elements to those described. For example, in FIG. 9, the header 14 can be provided with a tube 82 that extends through the center of the glass header 20. The tube 82 communicates with the cavity 76 defined between the cover 72 and transducer 44 via an aperture 84 which can be provided in the cover 72. This allows the transducer device to be used in applications where differential pressure measuring is desirable.

Moreover, although the hermetic bonding process of the present invention has been described in conjunction with a "dielectrically isolated" type of transducer, it should be understood that "non-isolated" types of transducer structures and the like, can likewise be packaged according to the methods and techniques of the present invention.

In any case, all variations or modifications to the invention described hereinabove are intended to be included within the scope of the invention as defined by the appended claims.

What is claimed is:

1. A semiconductor sensor device comprising:
    a semiconductor diaphragm member having a top surface coated with an oxide layer;
    P+ sensor elements fusion bonded to said oxide layer at a relatively central area of said diaphragm;
    P+ finger elements fusion bonded to said oxide layer extending from said sensors to an outer contact location of said diaphragm for each finger;
    an external rim of P+ material fusion bonded to said oxide layer and surrounding said sensors and fingers;
    a glass cover member electrostatically bonded to said fingers and rim to hermetically seal said sensors and fingers of said diaphragm member, said glass cover having a depression above said sensors and having a plurality of apertures, each aperture associated with a separate finger at said contact location wherein each contact location can be accessed via said associated aperture in said glass cover member.

2. The sensor device according to claim 1, further including a non-fired conductive glass frit mixture having gold particles located in said aperture in contact with said contact location.

3. The sensor device according to claim 2, further comprising a shell member disposed about said glass member containing a group of hermetically sealed pins for coupling to said semiconductor sensor chip.

4. The sensor device according to claim 2, wherein said shell member is hermetically bonded and sealed to said glass member with a glass-to-metal seal.

5. The sensor device according to claim 2, wherein the sensor device in claim 2 is attached to the shell glass member by coating the surface of the glass portion of the shell glass member with a thin layer of a glass frit such as pyroceram and inserting the pins of shell-glass member into the unfired glass-metal frit and firing the structure so as to seal the sensor to the shell glass-structure and affix the pins of this structure to the sensor structure.

6. The sensor device according to claim 2, wherein said sensor comprises a semiconductor pressure transducer.

7. The sensor device according to claim 5, wherein said semiconductor pressure transducer includes a diaphragm made from semiconductor material which flexes in response to an applied force, said diaphragm having at least one sensor element disposed on said surface for gaging the flexing of said diaphragm, said at least one contact coupled to said at least one sensor element for enabling an electrical connection to be made to said at least one sensor element.

8. The sensor device according to claim 6, wherein a dielectric layer is disposed between said diaphragm and said at least one sensor element for electrically isolating said at least one sensor element from said diaphragm.

9. The sensor device according to claim 7, wherein said at least one sensor element comprises at least one piezoresistive sensor element.

10. The sensor device according to claim 8, wherein said at least one sensor element comprises four sensor elements, said at least one contact comprises four contacts, said at least one cover aperture comprises four cover apertures, and said at least one pin aperture comprises four pin apertures.

11. A method in which a semiconductor sensor device is made by which coating a semiconductor diaphragm with an oxide layer;

fusion bonding P+ sensor elements to said oxide layer at a relatively central area of said diaphragm;

fusion bonding P+ finger elements to said oxide layer extending from said sensors to an outer contact location outside of the active portion of said diaphragm for each finger;

fusion bonding an external rim of P+ material to said oxide layer and surrounding said sensors and said fingers;

electrostatically bonding a glass cover to said fingers and said rim to hermetically seal said sensors and said fingers of said diaphragm member, said glass member made with a depression above said sensors and having a plurality of apertures associated with each finger but the apertures made smaller than the width of such fingers and being with the length of said fingers wherever each aperture associated with a separate finger at said contact location can be accessed via said associated aperture in said glass member.

12. The method according the claim 11, further comprising the step of inserting glass member into a shell member, wherein said shell glass member contains pins and sealing said pins to said glass member with the tips of said pins extending 2 to 5 mils above the glass member, coating said glass member with an unfired coating of a non-conductive glass frit such as pyroceram, placing said sensor on said glass member such that the pins of said glass member extend into the unfired glass-metal frit, and firing said composite structure to cure the pyroceram bonding the sensor to said glass member as well as firing the glass metal frit.

13. The method according to claim 10, wherein including the step of depositing a conductive glass frit mixture in said aperture.

14. The method according to claim 10, wherein said semiconductor sensor chip includes providing a semiconductor sensor chip having semiconductor device which comprises a semiconductor pressure transducer.

15. The method according to claim 13, wherein said semiconductor pressure transducer includes a diaphragm made from semiconductor material which flexes in response to an applied force, said diaphragm having at least one sensor element disposed on said surface for gaging the flexing of said diaphragm, said at least one contact coupled to said at least one sensor element for enabling an electrical connection to be made to said at least one sensor element.

16. The method according to claim 14, wherein a dielectric layer is disposed between said diaphragm and said at least one sensor element for electrically isolating said at least one sensor element from said diaphragm.

17. The method according to claim 15, wherein said at least one sensor element comprises at least one piezoresistive sensor element.

18. The method according to claim 13, wherein said conductive glass frit indicates gold particles.

19. The method according to claim 13, wherein said glass is Pyroceram.

20. The method according to claim 11, wherein said glass cover hereby is fabricated from Pyrex.

* * * * *